US010495120B2

(12) United States Patent
Fisher et al.

(10) Patent No.: US 10,495,120 B2
(45) Date of Patent: Dec. 3, 2019

(54) INTAKE VALVE TO ELIMINATE AIR INGESTION

(71) Applicant: GM GLOBAL TECHNOLOGY OPERATIONS LLC, Detroit, MI (US)

(72) Inventors: Michael A Fisher, Auburn Hills, MI (US); Vijay A Neelakantan, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 104 days.

(21) Appl. No.: 15/814,899

(22) Filed: Nov. 16, 2017

(65) Prior Publication Data

US 2019/0145440 A1 May 16, 2019

(51) Int. Cl.
*F15B 21/044* (2019.01)
*F15B 1/26* (2006.01)

(52) U.S. Cl.
CPC .............. *F15B 21/044* (2013.01); *F15B 1/26* (2013.01)

(58) Field of Classification Search
CPC .. F16H 57/0443; F16H 57/045; F15B 21/044; F15B 1/26; F01M 2011/0075
See application file for complete search history.

(56) References Cited

U.S. PATENT DOCUMENTS 4,354,521 A * 10/1982 Harde .................. B60K 15/077 137/571
4,762,201 A 8/1988 Malik
5,014,819 A * 5/1991 Gotou .................. F01M 11/065 184/6.2
5,101,936 A * 4/1992 Paredes .................... F01M 1/12 123/196 S
6,260,534 B1 * 7/2001 Kampichler .............. F02F 7/00 123/196 R
6,644,439 B2 * 11/2003 Schnitzer ................ F01M 1/02 184/106

(Continued)

FOREIGN PATENT DOCUMENTS

DE 2701939 A1 * 7/1978 ........... F01M 11/065
DE 4108657 A1 * 9/1992 ............. F01M 11/06

(Continued)

OTHER PUBLICATIONS

U.S. Appl. No. 15/641,411, filed Jul. 5, 2017 by GM Global Technology Operations LLC.

(Continued)

*Primary Examiner* — Thomas E Lazo

(57) ABSTRACT

A fluid management system for an automotive propulsion system is provided. The fluid management system includes a conduit system configured to deliver hydraulic fluid. A housing defining a sump is configured to collect a volume of hydraulic fluid and gaseous fluid. At least one intake valve is disposed in selective fluid communication with the conduit system and the sump. The intake valve(s) is/are configured to allow the passage of the hydraulic fluid from the sump to the conduit system and to substantially prevent the passage of the gaseous fluid from the sump to the conduit system. Thus, hydraulic fluid that is substantially free of air is provided to hydraulic system components downstream of the intake valve(s).

14 Claims, 4 Drawing Sheets

(56) References Cited

U.S. PATENT DOCUMENTS

| | | | | |
|---|---|---|---|---|
| 6,845,743 | B1 * | 1/2005 | Bishop | F01M 11/0004 123/195 C |
| 8,028,672 | B2 | 10/2011 | Prior et al. | |
| 8,292,036 | B2 * | 10/2012 | Nishida | F16H 57/0402 184/6.2 |
| 8,739,950 | B2 | 6/2014 | Lundberg et al. | |
| 8,899,266 | B2 * | 12/2014 | Varda | F15B 1/26 137/574 |
| 9,068,645 | B2 * | 6/2015 | Tamai | F16H 57/0447 |
| 9,200,713 | B2 | 12/2015 | Neelakantan et al. | |
| 9,856,931 | B2 | 1/2018 | Neelakantan et al. | |
| 2014/0261281 | A1 | 9/2014 | Jacques et al. | |

FOREIGN PATENT DOCUMENTS

| | | | | |
|---|---|---|---|---|
| EP | 0479081 | A1 * | 4/1992 | B60R 17/00 |
| FR | 2196004 | A5 * | 3/1974 | F01M 11/065 |
| FR | 2919337 | A1 * | 1/2009 | F01M 11/0004 |

OTHER PUBLICATIONS

U.S. Appl. No. 15/814,881, filed Nov. 16, 2017 by GM Global Technology Operations LLC.

* cited by examiner

INTAKE VALVE TO ELIMINATE AIR INGESTION

TECHNICAL FIELD

The present disclosure relates to a flow delivery system for intaking hydraulic fluid from a sump.

INTRODUCTION

Lubrication systems and hydraulic control systems for propulsion systems on passenger vehicles may be wet or dry sump systems.

A wet sump system is typically used on production vehicles in engines and/or transmissions. Hydraulic fluid is stored beneath the propulsion system in an oil pan. The oil pan is large and deep in order to hold sufficient amounts of hydraulic fluid to control and lubricate propulsion system components.

Some sump systems may use a dry sump, which utilizes an external tank to store some of the oil outside of the transmission or engine. Accordingly, a large and deep bottom oil pan is not required. Therefore, the main mass of the engine and transmission may be placed lower in the vehicle. Dry sump systems are commonly used with high-performance vehicles, such as racing vehicles that have high lateral-g maneuvers because high lateral-g maneuvers tend to starve some of the components of lubrication if the fluid is not provided from a known fluid source, such as the external, secondary sump. Fluid is scavenged by a scavenge pump and provided to the external, secondary sump.

During high lateral-g maneuvers, hydraulic fluid typically contains a large quantity of entrained air, which is absorbed into the hydraulic fluid due to splashing during the lubricating process. Entrained air lowers the lubricating efficiency of the fluid. To eliminate air from the system, either a large, deep wet sump system is used, or a dry sump system is used where the second, external sump can be sized and pumped from in a located that rids the hydraulic fluid of air.

Further improvements are desired to reduce the complexity and number of components needed in hydraulic sump systems, as well as to reduce the size of the sump housing.

SUMMARY

The present disclosure provides a fluid intake control valve that is configured to allow or block fluid based on the presence of hydraulic fluid. In some forms, multiple fluid intakes may be located in a sump, and the intake valves allow for hydraulic fluid to enter a conduit system, while blocking air from entering the conduit system.

In one form, which may be combined with or separate from the other forms disclosed herein, a fluid management system for an automotive propulsion system is provided. The fluid management system includes a conduit system configured to deliver hydraulic fluid, the conduit system defining a plurality of inlets. A housing defining a sump is configured to collect a volume of hydraulic fluid and gaseous fluid. A plurality of intake valves is disposed in selective fluid communication with the plurality of inlets and the sump. Each intake valve is configured to allow the passage of the hydraulic fluid from the sump to the conduit system and to substantially prevent the passage of the gaseous fluid from the sump to the conduit system.

In another form, which may be combined with or separate from the other forms disclosed herein, a fluid management system for an automotive propulsion system is provided. The fluid management system includes a conduit system configured to deliver hydraulic fluid. A housing defining a sump is configured to collect a volume of hydraulic fluid and gaseous fluid. At least one intake valve is disposed in selective fluid communication with the sump. The intake valve or valves are configured to allow the passage of the hydraulic fluid from the sump to the conduit system and to substantially prevent the passage of the gaseous fluid from the sump to the conduit system.

Further additional features may be provided, including but not limited to the following: the intake valve(s) being a floating valve; a relief valve being disposed within the intake valve or within each of the intake valves; each relief valve comprising a ball and a spring configured to bias the ball against an opening defined within the intake valve; each intake valve comprising a center portion defining the opening; each intake valve further comprising a floating portion surrounding the center portion, the floating portion configured to float on hydraulic fluid; the floating portion being moveable with respect to the center portion; the floating portion being moveable between an open floating position and a closed resting position; wherein each intake valve is configured to seal an inlet of the plurality of inlets when the floating portion of the respective intake valve is in the closed resting position; wherein each intake valve is configured to establish fluid communication between the sump and the conduit system when the floating portion of the respective intake valve is in the open floating position; wherein each intake valve is a swinging valve; each intake valve comprising a swinging portion defining a passage therethrough and a sealing cap; the swinging portion being moveable with respect to the sealing cap between an open position and a closed position; wherein each intake valve is configured to establish fluid communication between the sump, the passage, and the conduit system in the open position of the respective intake valve; wherein the sealing cap is configured to seal the passage in the closed position of the respective intake valve; and wherein the swinging portion has a round shape configured to rotate with respect to the sealing cap upon application of a predetermined acceleration force.

Further additional features may be provided, including but not limited to the following: the plurality of inlets of the conduit system comprising a first inlet and a second inlet; the first and second inlets being located at opposite ends of the housing defining the sump; a pump configured to pump fluid from the sump; the pump defining a pump inlet and a pump outlet; the pump being disposed within the conduit system; a fluid cooler assembly in fluid communication with the pump outlet; the intake valve being a three-way valve; the three-way valve being configured to move between a fully open position, a first closed position, and a second closed position; wherein in the open position, the first and second inlets are in fluid communication with the sump and the conduit system; wherein in the first closed position the first inlet is closed off from the conduit system and the second inlet is in fluid communication with the sump and the conduit system; wherein in the second closed position, the second inlet is closed off from the conduit system and the first inlet is in fluid communication with the sump and the conduit system; and the three-way valve being a shuttle valve comprising a sliding spool valve configured to slide within a valve housing.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DESCRIPTION

The following description is merely exemplary in nature and is not intended to limit the present disclosure, its application, or uses.

Figure 1:
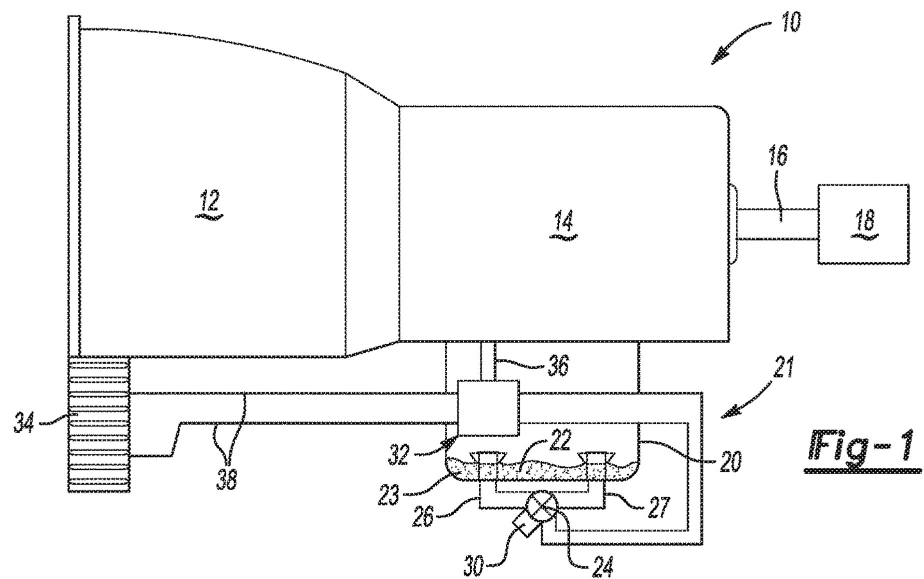
FIG. 1 is a diagrammatic view of a portion of a motor vehicle propulsion system including a fluid management system, in accordance with the principles of the present disclosure.

With reference to FIG. 1, a portion of a motor vehicle propulsion system is illustrated and generally designated by the reference number 10. The propulsion system 10 includes an engine or prime mover 12 that may be an internal combustion engine or hybrid power plant or any other desirable type of engine. The output of the engine 12 is provided to an automatic transmission 14. The automatic transmission 14 typically includes one or more planetary gear assemblies (not shown) connected to an output shaft 16 that is coupled to and drives a final drive assembly 18 which may include a propeller shaft, a differential, axles, wheels and tires (all not illustrated). In the alternative, the transmission 14 may be a CVT transmission having a pair of pulley sets.

In the illustrated example, the automatic transmission 16 includes a valve body, oil pan, or other housing 20, typically disposed at the lower or portion of the automatic transmission 16. The housing 20 defines a sump 22, which is a reservoir that collects hydraulic fluid 23 (and air) that typically drains down to the sump 22. One or more hydraulic pumps 24 are provided for pumping hydraulic fluid 23 from the sump 22 to other components. The pump 24 has an inlet connected to conduits 26, 27 disposed in selective fluid communication with the sump 22. The sump 22 and the inlet conduits 26, 27 are components of a fluid management system, or flow control system 21, for delivering fluid 23 within the propulsion system 10.

The hydraulic pump 24 may be driven by an electric motor 30 and is configured to provide pressurized hydraulic fluid 23 to, among other devices in the automatic transmission 16, a hydraulic control system 32, and/or an air-to-oil cooler (ATOC) or fluid cooler assembly 34. In other variations, hydraulic fluid 23 from the sump 22 may be provided to components of the engine 12. The hydraulic control system 32 selectively provides pressurized hydraulic fluid 23 through fluids lines 36 to clutches and components of the transmission 14 to control and lubricate components of the transmission 14. The hydraulic control system 32 may also provide hydraulic fluid 23 through lines 38 to the transmission oil cooler (ATOC) 34, which may be disposed in the vehicle radiator (not illustrated).

Figure 2:
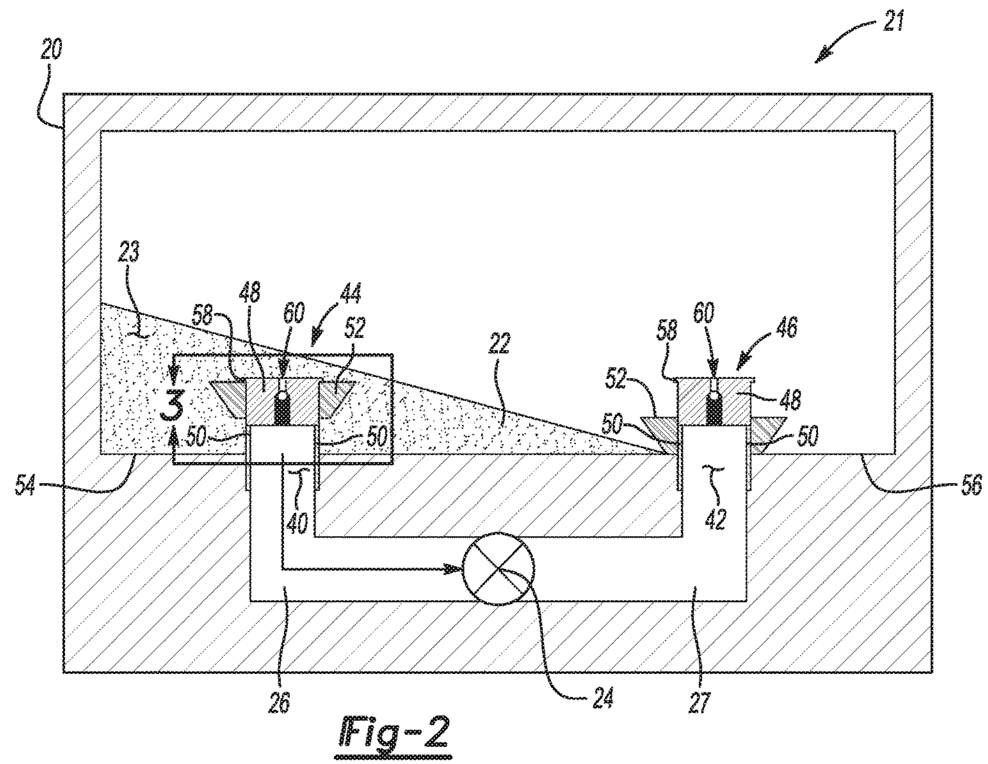
FIG. 2 is a diagrammatic view of one example of the fluid management system of the propulsion system of FIG. 1 including a plurality of floating intake valves, according to the principles of the present disclosure.

Referring now to FIG. 2, additional details of a fluid management system (or flow control system) 21 are illustrated. Each conduit 26, 27 defines an inlet 40, 42 from the sump 22. The conduits 26, 27 are configured to deliver hydraulic fluid 23 further within the propulsion system 10, through the pump 24, as explained above. Though one pump 24 is shown, each conduit 26, 27 could alternatively have its own pump 24, and additional inlets 40, 42 and/or conduits 26, 27 and pumps 24 could be provided, without falling beyond the spirit and scope of the present disclosure.

Each inlet 40, 42 has an associated intake valve 44, 46 that is disposed in selective fluid communication with the inlet 40, 42 and the sump 22. As will be explained in greater detail below, each intake valve 40, 42 is configured to allow the passage of the hydraulic fluid 23 from the sump 22 to the conduit system 26, 27 and to substantially prevent the passage of the gaseous fluid (such as air) from the sump 22 to the conduit system 26, 27.

Figure 3:
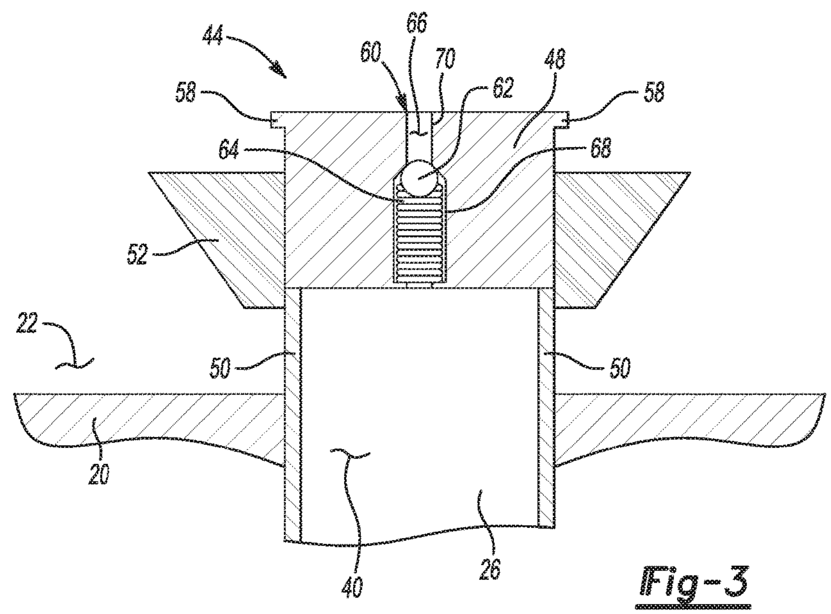
FIG. 3 is a diagrammatic cross-sectional view of one of the floating intake valves shown in FIG. 2, in accordance with the principles of the present disclosure.

In the illustrated example, each intake valve 44, 46 is a floating valve. The first floating valve 44 is illustrated in an enlarged view in FIG. 3, but it should be understood that the second floating valve 46 may be identical to the first floating valve 44. Each floating intake valve 44, 46 has a central portion 48 fixed to the sump housing 20, for example, by a plurality of stands 50. The stands 50 allow fluid to flow past them and do not completely block the inlets 40, 42. An annular floating portion 52 surrounds the central portion 48 and is slidably disposed about the central portion 48 and the stands 50. In the alternative, the floating portion 52 could be disposed radially inward of an annular portion fixed to the housing 20, if desired.

The floating portion 52 is thus moveable with respect to the central portion 48 of the intake valve 44. Furthermore, the floating portion 52 is configured to float on hydraulic fluid. The floating portion 52 is moveable between an open floating position and a closed resting position.

Referring to FIG. 2, hydraulic fluid 23 is shown on the left side 54 of the sump housing 20, such as the case may be when a lateral acceleration force is being applied to the vehicle by virtue of high-G maneuvers. The right side 56 of the sump housing 20, in the orientation of FIG. 2, is without hydraulic fluid 23 and hydraulic fluid 23 does not cover the inlet 42 to the second conduit 27. The floating portion 52 of the first intake valve 44 floats on the hydraulic fluid 23 that is disposed on the left side 54 of the sump housing 20. More particularly, the floating portion 52 of the first intake valve 44 has slid along the central portion 48 to a top position along the central portion 48. A lip 58 may prevent the floating portion 52 from sliding off of the central portion 48 in an upward direction. When the floating portion 52 is in a top position as shown with the intake valve 44 on the left side 54 of the sump housing 20, the floating portion 52 is in an open floating position (the intake valve 44 is open), and fluid communication is established between the sump 22 and the conduit 26. Fluid communication may be established between the sump 22 and conduit 26 also if the floating portion 52 is disposed partially upward along the stands 50 in a partially open position away from the housing 20.

On the other hand, the second intake valve 46 is closed with the floating portion 52 of the second intake valve 46 being in the closed resting position at a bottom position of the floating portion 52. This is because there is no hydraulic fluid 23, or not enough hydraulic fluid 23, disposed on the right side 56 of the sump housing 20 on which the floating portion 52 can float. In the closed resting position, the floating portion 52 rests on the housing 20 (or any other sealing surface) and effectively seals the inlet 42 so that hydraulic fluid 23 and gaseous fluid, such as air, cannot flow into the conduit 27.

The central portion 48 may be formed of a metal, such as stainless steel, while the floating portion 52 is formed of a more buoyant material, such as a plastic. For example, the floating portion 52 may be formed of a nylon, such as nylon 6 or nylon 66. The floating portion 52 could also be hollow or define hollow portions therein. In some examples, the top of the central portion 48 (at the lip 58) could be about 10 cm from the housing 20, if desired, with the floating portion 52 being in the range of about 5 cm in height.

Thus, the floating intake valves 44, 46 are configured to allow or block fluid passage to the conduits 26, 27 based on the presence of hydraulic fluid 23 at each inlet 40, 42, respectively. A plurality of fluid intake valves 44, 46 allow for multiple inlets 40, 42 (or hydraulic fluid 23 pickup points) while blocking air ingestion into the conduit system 26, 27 of the pressurized hydraulic system. The fluid management system 21 allows a wet sump system to be used without a dry sump system that has a separate sump and scavenge pump, if desired.

Each intake valve 44, 46 may have one or more relief valves 60 disposed within the intake valve 44, 46. Each relief valve 60 may have, for example, a ball 62 and a spring 64 biasing the ball 62 against an opening 66 formed through and defined within the central portion 48 of the intake valve 44, 46. The opening 66 may have, for example, a wide portion 68, in which the spring 64 and ball 62 are disposed, and a narrow portion 70 that may be sealed by the ball 62.

The relief valves 60 are configured to allow the passage of hydraulic fluid 23 through the opening 66 in the central portion 48 of the intake valve 44, 46 if the intake valves 44, 46 are stuck shut, for example, by pump pressure. If suction pressure exceeds the force of the spring 64 and ball 62, the ball 62 will become compressed against the spring 64 to allow fluid communication between the sump 22 and the inlet 40, 42 through the opening 66 in the center portion 48 of the intake valve 44, 46.

Figure 4:
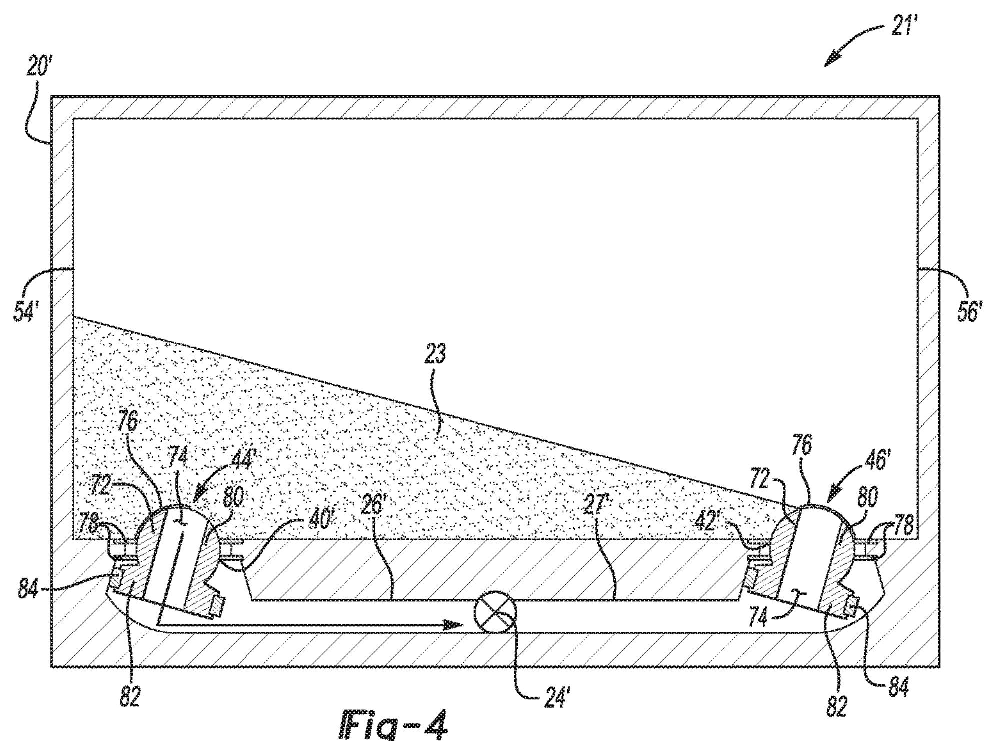
FIG. 4 is a diagrammatic view of another example of a fluid management system that may be used with the propulsion system of FIG. 1, including a plurality of swinging intake valves, according to the principles of the present disclosure.
Figure 5:
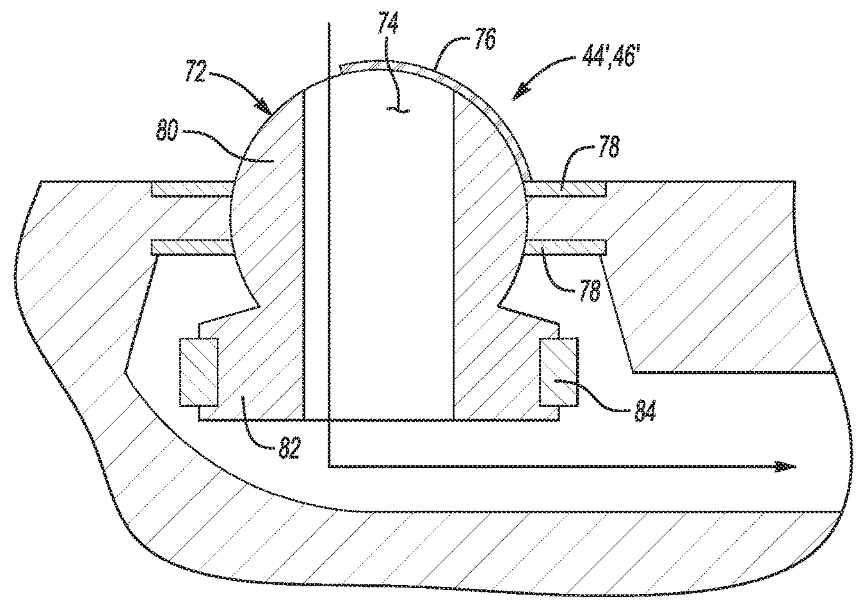
FIG. 5 is a diagrammatic cross-sectional view of one of the swinging intake valves shown in FIG. 4, in accordance with the principles of the present disclosure.

Referring now to FIGS. 4-5, another variation of the fluid management system is illustrated and generally designated at 21'. The fluid management system 21' may be used in the propulsion system 10, and aspects of the fluid management system 21' not shown in FIGS. 4-5 may be similar to the fluid management system 21 described in FIG. 1 or FIGS. 2-3.

The fluid management system 21' includes a housing 20' defining a sump 22' and a plurality of conduits 26', 27' in fluid communication with one or more hydraulic pumps 24'. The pump 24' has an inlet connected to conduits 26', 27' disposed in selective fluid communication with the sump 22'. The hydraulic pump 24' is configured to provide pressurized hydraulic fluid 23 to, among other devices in the automatic transmission 16, a hydraulic control system 32, an air-to-oil cooler (ATOC) or fluid cooler assembly 34, or the engine 12.

Each conduit 26', 27' defines an inlet 40', 42' from the sump 22'. Though one pump 24' is shown, each conduit 26', 27' could alternatively have its own pump 24', and additional inlets 40', 42' and/or conduits 26', 27' and pumps 24' could be provided, without falling beyond the spirit and scope of the present disclosure.

Each inlet 40', 42' has an associated intake valve 44', 46' that is disposed in selective fluid communication with the inlet 40', 42', respectively, and the sump 22'. As will be explained in greater detail below, each intake valve 40', 42' is configured to allow the passage of the hydraulic fluid 23 from the sump 22' to the conduit system 26', 27' and to substantially prevent the passage of the gaseous fluid (such as air) from the sump 22' to the conduit system 26', 27'.

In the illustrated example, each intake valve 44', 46' is a swinging valve. Each swinging intake valve 44', 46 has a swinging portion 72 defining a passage 74 therethrough and a sealing cap 76. In this example, the sealing cap 76 is fixed to the sump housing 20'. The swinging portion 72 may have a round, ball-like shape and may be rotatably held to the housing 20' via a pair of retaining annuluses 78. The swinging portion 72 may have a ball portion 80 attached to (or integrally formed with) a bottom portion 82.

The swinging portion 72 is moveable with respect to the sealing cap 76 of each intake valve 44', 46'. More particularly, the swinging portion 72 is configured to rotate with respect to the sealing cap 76 upon application of a predetermined acceleration force. The swinging portion 72 is moveable between an open position and a closed position. In the open position, each intake valve 44' 46' is configured to establish fluid communication between the sump 22', the passage 74, and one of the conduits 26', 27'. In the closed position, the sealing cap 76 is configured to seal the passage 74 so that fluid communication is disrupted between the sump 22' and the respective conduit 26', 27'.

Referring to FIG. 4, hydraulic fluid 23 is shown on the left side 54' of the sump housing 20', such as the case may be when a lateral acceleration force is being applied to the vehicle by virtue of high-G maneuvers. The right side 56' of the sump housing 20', in the orientation of FIG. 4, is without hydraulic fluid 23 and hydraulic fluid 23 does not cover the inlet 42' to the second conduit 27'.

When an acceleration force is applied, the bottom portions 82 of the swinging portions 72 swing in the same direction as the displacement of the hydraulic fluid 23 (to the left as shown in FIG. 4). As such, the central openings 74 swing as shown either into or away from the sealing caps 76, depending on which side of the housing 20' the intake valve 44', 46' is disposed. Each sealing cap 76 is attached along a side of the respective inlet 40', 42' closest to a side 54', 56' of the housing 20'. Thus, under an acceleration force that moves the hydraulic fluid 23 as shown in FIG. 4, the passage 74 of the first valve 44' is open to the sump 22, and the first valve 44' is in the open position establishing fluid communication between the sump 22', the passage 74, and the conduit 26'. The passage 74 of the second valve 46' is sealed by the sealing cap 76 of the second valve 46', and the second valve 46' is closed.

If all of the hydraulic fluid 23 were to accelerate toward the right side 56' of the sump housing 20', the swinging portions 72 of the intake valves 44', 46' would swing in the opposite direction, and the second intake valve 44' would open to establish fluid communication between the sump 22' and the conduit 27', while the first intake valve 44' would be sealed against its sealing cap 76.

As a result, the intake valves 44', 46' are configured to allow or block fluid passage to the conduits 26', 27' based on the presence of hydraulic fluid 23 at each inlet 40', 42', respectively, because an acceleration force that moves the hydraulic fluid 23 away from a respective inlet 40', 42' also closes the respective intake valve 44', 46'. A plurality of fluid intake valves 44', 46' allow for multiple inlets 40', 42' (or hydraulic fluid 23 pickup points) while blocking air ingestion into the conduit system 26', 27' of the pressurized hydraulic system. It should be noted that when no acceleration or negligible effective acceleration is experience by the intake valves 44', 46', the bottoms 82 are disposed directly under the ball portions 80 of the swinging portions 72, and fluid communication is established between the sump 22' and the conduits 26', 27', as shown in FIG. 5.

An annular stop 84 or other stops may be applied around the bottom portions 82 to limit travel or to reduce shock to the retaining annuluses 78 that may be caused by the bottom portions 82 otherwise striking the retaining annuluses 78.

The swinging portion 72 may be formed of a metal, such as a polished stainless steel, and the sealing cap 76 may be formed of a plastic or metal, as desired. The retaining annuluses 78 may also be formed of a plastic, such as PA46, or any other desired material. The annular stop 84 may be formed of a shock-absorbing material, such as rubber, or any other desired material.

Figure 6:
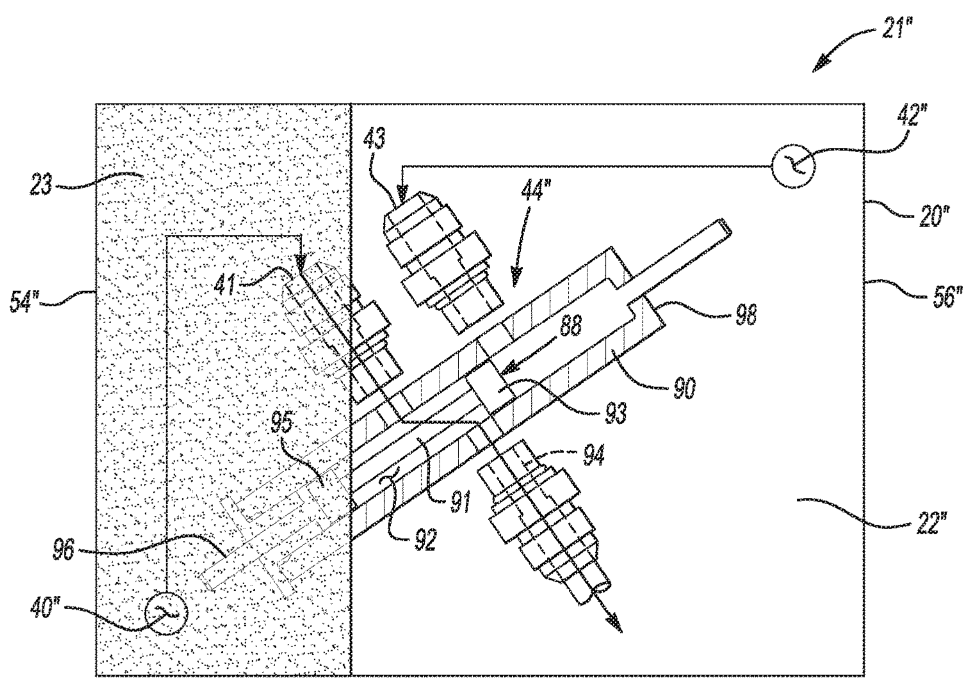
FIG. 6 is a diagrammatic view of yet another example of a fluid management system that may be used with the propulsion system of FIG. 1, including a three-way intake valve, according to the principles of the present disclosure.
Figure 7:
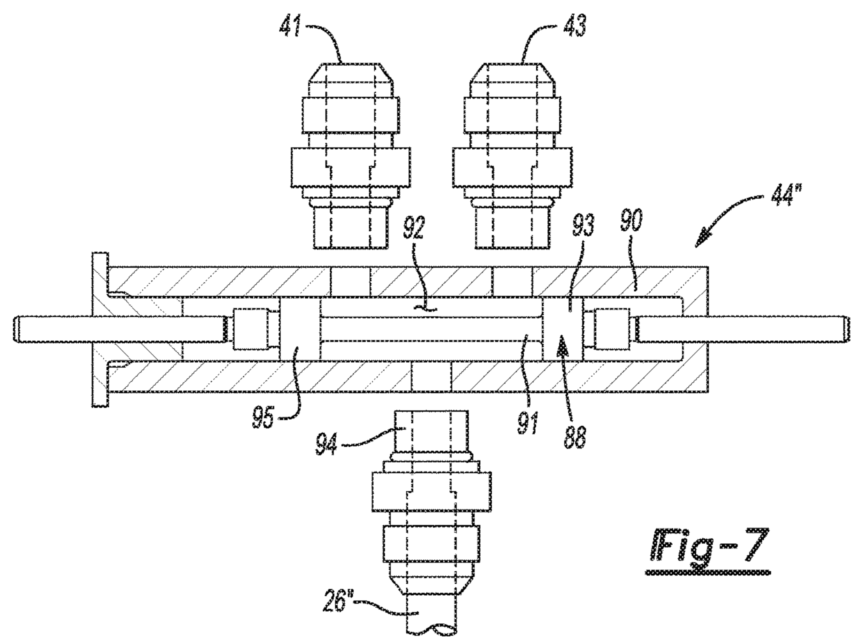
FIG. 7 is a diagrammatic side view of the three-way intake valve shown in FIG. 6, in accordance with the principles of the present disclosure.

Referring now to FIGS. 6-7, yet another variation of the fluid management system is illustrated and generally designated at 21". The fluid management system 21" may be used in the propulsion system 10, and aspects of the fluid management system 21" not shown in FIGS. 6-7 may be similar to the fluid management systems 21, 21' described in FIG. 1 or FIGS. 2-5.

The fluid management system 21" includes a housing 20" defining a sump 22" and one or more conduits 26" in fluid communication with one or more hydraulic pumps (not shown, but similar to 24, 24'). The conduit 26" is disposed in selective fluid communication with the sump 22".

A plurality of fluid pick up points 40", 42" are in fluid communication with the sump 22". A three-way valve, such as a shuttle valve 44", is configured to establish selective fluid communication between the fluid pick up points 40", 42" from the sump 22" and the conduit 26". As such, a pair of inlets 41, 43 to the shuttle valve 44" are in fluid communication with the fluid pick points 40", 42", respectively, of the sump 22". As will be explained in greater detail below, the shuttle valve 44" is configured to allow the passage of the hydraulic fluid 23 from the sump 22" to the conduit 26" and to substantially prevent the passage of the gaseous fluid (such as air) from the sump 22" to the conduit 26".

The shuttle valve 44" or other three-way valve or other three-way valve has a sliding spool valve 88 configured to slide within a valve housing 90. The shuttle valve 44", in this example, is configured to move between a fully open position (as shown in FIG. 7), a first closed position (as shown in FIG. 6), and a second closed position wherein the spool 88 moves all the way to the right side 98 of the housing 90, in the orientation of FIGS. 6-7.

In the open position (shown in FIG. 7), the first and second inlets 41, 43 to the shuttle valve 44" are in fluid communication with a passage 92 defined by the valve housing 90 and a narrow part 91 of the spool valve 88, and further with an inlet 94 to the conduit 26". Thus, fluid communication is established between each of the inlets 41, 43 and the conduit 26".

Referring now to FIG. 6, hydraulic fluid 23 is shown on the left side 54" of the sump housing 20", such as the case may be when a lateral acceleration force is being applied to the vehicle by virtue of high-G maneuvers. The right side 56" of the sump housing 20", in the orientation of FIG. 6, is without hydraulic fluid 23 and hydraulic fluid 23 does not cover the pickup point 42" that is in communication with the second inlet 43 to the shuttle valve 44".

When an acceleration force is applied, a left side 96 of the shuttle valve housing 90 tilts or pivots downward in the same direction that the hydraulic fluid 23 flows (to the left as shown in FIG. 6). As such, the spool valve 88 slides to the left side 96 of the housing 90 and establishes fluid communication between the inlet 41, the fluid passage 92, and the inlet 94 to the conduit 26". The inlet 43 is blocked from fluidly communicating with the inlet 94 to the conduit 26" by a wide right portion 93 of the spool valve 88. Thus, under an acceleration force that moves the hydraulic fluid 23 as shown in FIG. 6, the first inlet 41 to the shuttle valve 44" is open to the conduit 26", while the second inlet 43 to the shuttle valve 44" is closed off from the conduit 26".

If all of the hydraulic fluid 23 were to accelerate toward the right side 56" of the sump housing 20", shuttle valve 44" would pivot in the opposite direction with the right side 98 extending downward and the spool 88 of the shuttle valve 44" would slide to the right side 98. In such a configuration, the second inlet 43 would then be open to the inlet 94 to the conduit 26" to establish fluid communication between the sump 22" and the conduit 26", while the first inlet 41 would be sealed off from the inlet 94 to the conduit 26" by the left wide portion 95 of the spool valve 88.

As a result, the shuttle valves 44" is configured to allow or block fluid passage to the conduit 26" based on the presence of hydraulic fluid 23 at each pick up point 40', 42", and thus each inlet 41, 43, respectively, because an acceleration force that moves the hydraulic fluid 23 away from a respective pick up point 40", 42" also causes the shuttle valve 44" to pivot and the spool 88 to slide, and thus closes off the inlet 41, 43 that is not covered by hydraulic fluid 23. The shuttle valve 44" allows for multiple hydraulic fluid pick up points 40", 42" while blocking air ingestion into the conduit system 26" of the pressurized hydraulic system.

As fluid sloshes around in the sump 22, 22', 22" air may become entrained in the hydraulic fluid 23, which is often undesirable for pumping to other components, such as the fluid cooler assembly 34. The flow control system 21, 21', 21" is configured to exclude air from the conduits 26, 26', 26", 27, 27' by closing off any conduit 26, 26', 26", 27, 27" that is not covered by hydraulic fluid 23 such that hydraulic fluid 23 substantially free of air flows past the intake valves 44, 46, 44', 46', 44".

Figure 8:
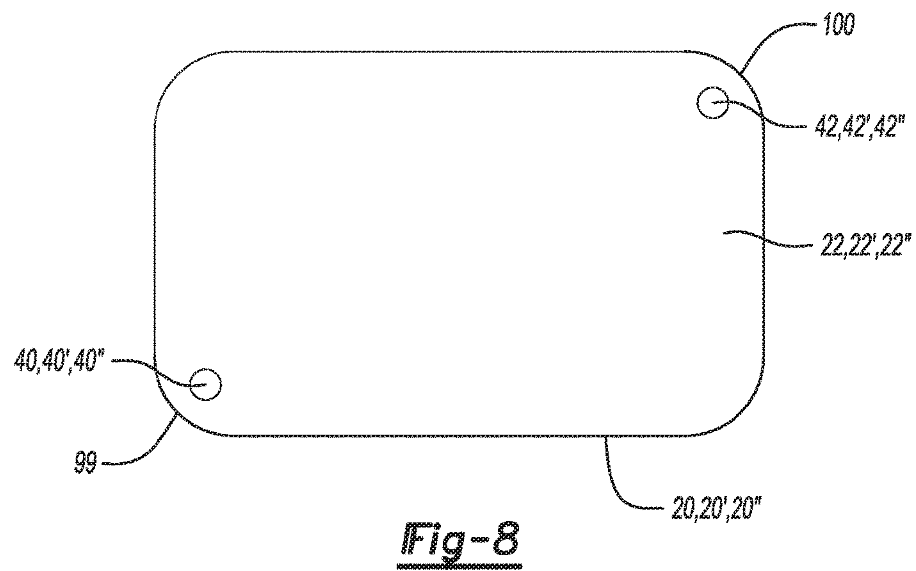
FIG. 8 is a diagrammatic plan view of a sump housing of the fluid management systems of FIGS. 1-2, 4, and 6, in accordance with the principles of the present disclosure.

Referring to FIG. 8, a plan view of the sump housing 20, 20', 20" of any of the fluid management systems 21, 21', 21" is illustrated. The first inlets 40, 40' (or fluid pick up point 40") and the second inlets 42, 42' (or fluid pick up point 42") are located at opposite ends 99, 100 of the sump housing 20, 22', 22". Accordingly, as high lateral-g moves are made, hydraulic fluid 23 is likely to cover at least one of the inlets or fluid pick up points 40, 40', 40", 42, 42', 42".

The description is merely exemplary in nature and variations that do not depart from the gist of the disclosure are intended to be within the scope of the disclosure. Such variations are not to be regarded as a departure from the spirit and scope of the disclosure.

What is claimed is:

1. A fluid management system for an automotive propulsion system, comprising:

a conduit system configured to deliver hydraulic fluid, the conduit system defining a plurality of inlets;

a housing defining a sump configured to collect a volume of hydraulic fluid and gaseous fluid;

a plurality of intake valves disposed in selective fluid communication with the plurality of inlets and the sump, each intake valve being configured to allow the passage of the hydraulic fluid from the sump to the conduit system and to substantially prevent the passage of the gaseous fluid from the sump to the conduit system, wherein each intake valve of the plurality of intake valves is a floating valve; and a plurality of relief valves, each relief valve of the plurality of relief valves being disposed within an intake valve of the plurality of intake valves.

2. The fluid management system of claim 1, each relief valve of the plurality of relief valves comprising a ball and a spring configured to bias the ball against an opening defined within an intake valve of the plurality of intake valves.

3. The fluid management system of claim 2, each intake valve comprising a center portion defining the opening, each intake valve further comprising a floating portion surrounding the center portion, the floating portion configured to float on hydraulic fluid.

4. The fluid management system of claim 3, the floating portion being moveable with respect to the center portion, the floating portion being moveable between an open floating position and a closed resting position, wherein each intake valve is configured to seal an inlet of the plurality of inlets when the floating portion of the respective intake valve is in the closed resting position, and wherein each intake valve is configured to establish fluid communication between the sump and the conduit system when the floating portion of the respective intake valve is in the open floating position.

5. The fluid management system of claim 1, the plurality of inlets of the conduit system comprising a first inlet and a second inlet, the first and second inlets being located at opposite ends of the housing defining the sump.

6. The fluid management system of claim 5, further comprising a pump configured to pump fluid from the sump, the pump defining a pump inlet and a pump outlet, the pump being disposed in fluid communication with the conduit system.

7. The fluid management system of claim 6, further comprising a fluid cooler assembly in fluid communication with the pump outlet.

8. A fluid management system for an automotive propulsion system, comprising:

a conduit system configured to deliver hydraulic fluid, the conduit system defining a plurality of inlets;

a housing defining a sump configured to collect a volume of hydraulic fluid and gaseous fluid; and a plurality of intake valves disposed in selective fluid communication with the plurality of inlets and the sump, each intake valve being configured to allow the passage of the hydraulic fluid from the sump to the conduit system and to substantially prevent the passage of the gaseous fluid from the sump to the conduit system, wherein each intake valve is a swinging valve, each intake valve comprising a swinging portion defining a passage therethrough and a sealing cap, the swinging portion being moveable with respect to the sealing cap between an open position and a closed position, wherein each intake valve is configured to establish fluid communication between the sump, the passage, and the conduit system in the open position of the respective intake valve, and wherein the sealing cap is configured to seal the passage in the closed position of the respective intake valve.

9. The fluid management system of claim 8, wherein the swinging portion has a round shape configured to rotate with respect to the sealing cap upon application of a predetermined acceleration force.

10. The fluid management system of claim 8, the plurality of inlets of the conduit system comprising a first inlet and a second inlet, the first and second inlets being located at opposite ends of the housing defining the sump.

11. A fluid management system for an automotive propulsion system, comprising:

a conduit system configured to deliver hydraulic fluid;

a housing defining a sump configured to collect a volume of hydraulic fluid and gaseous fluid; and at least one intake valve disposed in selective fluid communication with the conduit system and the sump, the at least one intake valve being configured to allow the passage of the hydraulic fluid from the sump to the conduit system and to substantially prevent the passage of the gaseous fluid from the sump to the conduit system, the at least one intake valve being a three-way valve configured to move between a fully open position, a first closed position, and a second closed position, wherein in the open position, fluid communication is established between the sump and first and second inlets to the conduit system, wherein in the first closed position, the first inlet is closed off from the conduit system and the second inlet is in fluid communication with the sump and the conduit system, and wherein in the second closed position, the second inlet is closed off from the conduit system and the first inlet is in fluid communication with the sump and the conduit system, the three-way valve being a shuttle valve comprising a sliding spool configured to slide within a valve housing, the valve housing being pivotable to establish fluid communication between one of the first and second inlets and the hydraulic fluid.

12. A fluid management system for an automotive propulsion system, comprising:

a conduit system configured to deliver hydraulic fluid;

a housing defining a sump configured to collect a volume of hydraulic fluid and gaseous fluid;

at least one intake valve disposed in selective fluid communication with the conduit system and the sump, the at least one intake valve being configured to allow the passage of the hydraulic fluid from the sump to the conduit system and to substantially prevent the passage of the gaseous fluid from the sump to the conduit system, wherein the at least one intake valve is a floating valve; and a relief valve disposed within the at least one intake valve.

13. The fluid management system of claim 12, the at least one intake valve comprising a center portion defining the opening, the at least one intake valve further comprising a floating portion surrounding the center portion, the floating portion configured to float on hydraulic fluid.

14. A fluid management system for an automotive propulsion system, comprising:

a conduit system configured to deliver hydraulic fluid;

a housing defining a sump configured to collect a volume of hydraulic fluid and gaseous fluid; and at least one intake valve disposed in selective fluid communication with the conduit system and the sump, the at least one intake valve being configured to allow the passage of the hydraulic fluid from the sump to the conduit system and to substantially prevent the passage of the gaseous fluid from the sump to the conduit system, the at least one intake valve being a swinging valve comprising a swinging portion defining a passage therethrough and a sealing cap, the swinging portion being moveable with respect to the sealing cap between an open position and a closed position, wherein the at least one intake valve is configured to establish fluid communication between the sump, the passage, and the conduit system in the open position, and wherein the sealing cap is configured to seal the passage in the closed position.

* * * * *